United States Patent
Marx et al.

(10) Patent No.: US 9,714,825 B2
(45) Date of Patent: Jul. 25, 2017

(54) WAFER SHAPE THICKNESS AND TRENCH MEASUREMENT

(75) Inventors: David S. Marx, Newbury Park, CA (US); David L. Grant, Newbury Park, CA (US)

(73) Assignee: Rudolph Technologies, Inc., Budd Lake, NJ (US)

( * ) Notice: Subject to any disclaimer, the term of this patent is extended or adjusted under 35 U.S.C. 154(b) by 91 days.

(21) Appl. No.: 13/066,219

(22) Filed: Apr. 8, 2011

(65) Prior Publication Data

US 2012/0257207 A1    Oct. 11, 2012

(51) Int. Cl.
| | | |
|---|---|---|
| *G01B 11/24* | (2006.01) | |
| *G01B 9/02* | (2006.01) | |
| *G01B 11/06* | (2006.01) | |
| *G01B 11/22* | (2006.01) | |
| *G01B 11/30* | (2006.01) | |

(52) U.S. Cl.
CPC ...... *G01B 11/2441* (2013.01); *G01B 9/02004* (2013.01); *G01B 9/0209* (2013.01); *G01B 11/06* (2013.01); *G01B 11/0675* (2013.01); *G01B 11/22* (2013.01); *G01B 11/306* (2013.01); *G01B 2210/56* (2013.01)

(58) Field of Classification Search
CPC .................................................. G01B 11/2441
USPC ........................................................ 356/504
See application file for complete search history.

(56) References Cited

U.S. PATENT DOCUMENTS

| | | | |
|---|---|---|---|
| 6,388,756 B1* | 5/2002 | Ho ......................... | G01B 11/22 356/446 |
| 6,847,458 B2* | 1/2005 | Freischlad et al. ........... | 356/503 |
| 7,280,221 B2* | 10/2007 | Wei ............................... | 356/479 |
| 2004/0257583 A1* | 12/2004 | Kim ................... | G01B 11/0625 356/504 |
| 2005/0225769 A1* | 10/2005 | Bankhead et al. ............ | 356/497 |
| 2006/0098206 A1* | 5/2006 | Kim ................... | G01B 11/0675 356/495 |
| 2007/0091317 A1* | 4/2007 | Freischlad et al. .......... | 356/511 |
| 2007/0148792 A1* | 6/2007 | Marx ..................... | H01L 22/12 438/14 |
| 2008/0297765 A1* | 12/2008 | Weidner ................. | G01N 21/41 356/51 |
| 2009/0051924 A1* | 2/2009 | Ito et al. ....................... | 356/503 |
| 2009/0059239 A1* | 3/2009 | Hoffmann et al. ........... | 356/498 |

(Continued)

*Primary Examiner* — Tarifur Chowdhury
*Assistant Examiner* — Omar Nixon
(74) *Attorney, Agent, or Firm* — Dicke, Billig & Czaja, PLLC (57) ABSTRACT

A device (10) and methods for simultaneously measuring the thickness of individual wafer layers, the depth of etched features on a wafer, and the three-dimensional profile of a wafer. The structure of the device (10) is comprised of a source/receiver section (12) having a broadband source (14), a receiver (16) and a signal processing section (20). An interferometer (28) separates or combines measurement and reference light and has a measurement leg (30) and a reference leg (34), and a reference mirror (36). The device (10) analyzes a received spectrum which is comprised of a measurement of intensity versus wavelength. There are two measurement methods disclosed: the first method is utilized for taking a single measurement and the second method is utilized for multiple measurements.

19 Claims, 6 Drawing Sheets

(56) References Cited

U.S. PATENT DOCUMENTS

| | | | |
|---|---|---|---|
| 2009/0168069 A1* | 7/2009 | Nambu | G01B 11/046 356/448 |
| 2010/0284027 A1* | 11/2010 | Scheiner | G01B 11/22 356/626 |
| 2010/0321671 A1* | 12/2010 | Marx et al. | 356/51 |
| 2012/0218560 A1* | 8/2012 | Joo | G01B 11/0675 356/503 |

* cited by examiner

WAFER SHAPE THICKNESS AND TRENCH MEASUREMENT

TECHNICAL FIELD

The invention generally pertains to optical measuring devices and methods, and more particularly to a device and methods for simultaneously measuring three aspects of a test object such as a wafer.

BACKGROUND ART

There is a relentless effort to make electronics and memory circuits smaller, which continues to drive semiconductor manufacturers. The industry is currently developing 3D integrated circuits (3DICs), which requires physically stacking integrated circuit chips and using Through Silicon Vias (TSV) filled with a conductor to electrically connect the chips. The 3DICs create new possibilities for miniaturization and circuit architectures. There are a variety of techniques and technologies required to facilitate 3DICs and the construction of TSVs. A hole utilized for a TSV is typically 5 to 100 microns in diameter and typically 50 to 500 microns deep. These etched features, and others such as trenches, are called High Aspect Ratio features because they have a greater depth than width. The generic construction process for 3DIC's is:
  1) etch the TSV and fill with copper to create connections to the circuit,
  2) build the electrical circuits on the wafer,
  3) attach (bond with adhesive) the wafer to a carrier wafer with the circuits facing the carrier wafer, and
  4) grind and etch the backside (called "blanket etch") of the wafer to expose the copper interconnects.

Each of these steps requires critical tolerances and process control. Four important measurements are identified as critical:
  1) thickness of the wafer during and after the grind and blanket etch,
  2) etch depth of the TSV,
  3) surface height of the exposed copper interconnect, and
  4) shape (i.e. warp, and bow) of the wafer.

Semiconductor manufacturers measure wafer thickness for many reasons. For the 3DIC process described above, the wafer thickness is measured before bonding to a carrier, during the thinning process, and after the thinning process. In addition, the thicknesses of the adhesive layer and carrier wafer may also be required. The most common techniques for thinning a wafer are back grinding and etching, both of which operate on the back side, or non-device side, of the wafer. A manufacturer must polish or grind the back side of the wafer to the desired thickness with high uniformity. Tight monitoring of the wafer thickness, and thickness uniformity, is important in order to protect the TSVs. Too much thinning will damage the vias and ruin the circuits already constructed. Thinning too slowly reduces throughput and increases cost. Thinning in a non-uniform manner results in only some TSVs being properly exposed, thereby causing a low yield.

In addition to 3DICs, there are a variety of reasons why wafers need to be thinned. The most common are to improve heat dissipation, to improve the performance of image sensors, and to create Silicon On Insulator (SOI) type wafers. SOI is basically the fusing of two wafers with a thin oxide layer between the wafers. These wafers are commonly used for micro-electromechanical systems (MEMS) or for particular electronic properties of very thin silicon over a dielectric layer. The process typically involves attaching a device wafer to an oxide layer, frequently without an adhesive, and then polishing the device wafer to a specified thickness. The second wafer, which is known as the handle wafer, is sacrificial and is used simply to maintain the mechanical integrity of the device wafer.

There are many prior art methods for measuring wafer thickness. Examples are systems that utilize capacitive sensors, laser triangulation sensors, interferometers, and chromatic confocal sensors. Capacitive sensors require in-depth knowledge of the layer material and can generally only function correctly for a single layer of material, not wafer stacks. Additionally, capacitive sensors have a low thickness limit of approximately 200 microns, and are limited to a small sample of materials.

A technique using two opposing height sensors can measure thickness on thin samples and can accommodate multiple layers that are made of virtually any material, as they detect the physical surface of the wafer [4]. However, this technique requires delicate alignment in all three axes and requires calibration to "teach" the sensors how far apart they are in space. This calibration requirement is the lower limit to accuracy of the measurements made.

These systems fail when the wafer consists of multiple layers. The layers can include tape, a glass or silicon carrier, an adhesive layer, an insulator layer, and/or a product silicon layer. Because of the complicated structures and opacity to visible light of these various layers, the prior art systems might be able to measure the total thickness of an entire stack of layers, but rarely can they measure the thickness of the individual layers with high accuracy and repeatability.

Another type of prior art for wafer thickness measurement includes reflectometers and Fourier Transform Infrared (FTIR) spectrometer. For example, see [1, 6, 11, and 14]. These techniques measure thickness directly, and can usually differentiate between different layers, for example wafers bonded with an adhesive. However, these methods cannot measure shape as they produce no information regarding distance. Furthermore, when measuring multiple layers, these methods cannot determine the order of the layers. For example, if a sample consists of a thin silicon layer on top of a thick glass layer, reflectometer methods cannot determine whether the thin silicon layer is above or below the thick glass layer.

Specifically regarding the thinned wafers in the 3DIC process and the SOI process, there is no method of quickly and accurately measuring the thickness of a device wafer, other than the reflectometer described in [14]. Present technology measures the entire stack and cannot differentiate between the two wafers (device wafer and carrier wafer). Thus, process engineers are required to measure the carrier and the oxide layer prior to the attachment of the device wafer. These values are then subtracted from the total thickness measurement to produce the device layer thickness. In an alternative current method, wafers are thinned until visual inspection shows the vias exposed, with no knowledge of the thickness of the wafer.

For the measurement of narrow deep etches, whether round such as TSVs, or long such as trenches, optical non-contact techniques often fail when the aspect ratio (depth:width) of an etched feature is large and the width is small. The reason is because optical techniques cannot acquire information from the bottom of the etched feature when viewed from the top. This is true for confocal, interferometric, and other microscopic techniques. Optical techniques are limited to an aspect ratio of 2 or 3 to 1 when the feature width is approximately 5 µm or smaller. For trenches with a higher aspect ratio, the only current method to directly measure the depth is by destructively sectioning the wafer and viewing the trench from the side. Not only is the sample destroyed by this method, but electron microscopes are utilized, which are typically expensive and time consuming to use.

There are many prior art methods for measuring the depth of an etched feature on a wafer. Examples are systems that utilize white light interferometers, laser triangulation sensors, and chromatic confocal sensors [3]. All of these systems, that we are aware of, illuminate an etched feature from the top, i.e. the first surface to receive the illumination is the surface that is etched. In this configuration ("top illumination") the ability of the system to measure the etched depth strongly depends on the aspect ratio of the etched feature. Aspect ratio is usually defined as the ratio of the etched feature depth to its width or diameter. When the width is small, but the depth large, very little of the source light is incident on the etched surface, which is located at the bottom of the trench or hole. At best, the measurement is made with low signal-to-noise ratio (SNR), and at worst there is no measurement at all.

Another prior art method that avoids some of the problems described above is Model-based infrared reflectometry (MBIR) [2]. MBIR is an indirect method that relies on the test object consisting of periodic structures. A large area of the test object is illuminated at a specific angle of incidence and then the reflected and diffracted fields are measured at different angles, wavelengths and polarizations. Dimensions of the test object, such as width and depth, are then calculated by solving an inverse physical model of the diffraction. MBIR is typically used to measure dimensions of small features, such as etched vias. However, it requires the presence of periodic structures and so cannot measure the etched depth of individual vias. Furthermore, MBIR cannot measure large scale shape, such as bow and warp, and MBIR cannot measure the thickness of multiple layers.

The measure of wafer shape, roughness, and exposed TSVs are inherently different from the thickness measurements described above. These parameters are measured as a distance to, or height of, a single specific surface. Both microscopic features, such as metal lines, and macroscopic measures, such as wafer warp, are included. In contrast, the thickness measurements described above relate to the distance between two surfaces. Thus, presently, different sensors or sensor arrangements are used for distance type measurements than for thickness type measurements.

Wafer warp and bow are industry standard metrics of wafer shape. Wafers typically warp as a result of coatings and adhesives being applied and processed at high temperature. As the wafer cools, the mismatch in thermal expansion of the different materials causes internal stress within the wafer, and thus bowing. Wafer shape is an important consideration for several reasons. Large warp prevents robotic wafer handlers from reliably loading wafers. As described above, wafers are typically bonded to carrier wafers as part of the 3DIC process, and a large warp and bow interfere with the bonding process. The problem becomes more severe as the wafers are thinned, as the internal stress within the wafer causes more bowing in a thin wafer than the same stress would in a thick wafer.

The height and height uniformity of the TSVs exposed by the thinning process disclosed above is important to the success of the 3DIC process. Other microscopic height profile measurements include surface roughness, the height of metal lines, the height of exposed TSV contacts, and the profile of micro-electromechanical features. One example of the prior art for distance or surface height measurement is a chromatic confocal height sensor [12].

Scanning White Light Interferometry, Low Coherence Interferometry, and Time Domain Optical Coherence Tomography are methods that typically employ broadband incoherent sources, such as a Michelson or Mirau interferometer, with the sample in one leg and a reference mirror in the other leg. The reference mirror is scanned in the axial direction to modulate the optical path difference (OPD) length between the two legs [7, 8]. Alternatively, the reference leg can be fixed and the measurement leg axially scanned.

The Low Coherence Interferometry microscope described by de Groot in [7] is not spectroscopic and requires axial scanning for each measurement. In essence, the spectroscopic nature of the present invention removes the axial scanning requirement of [7]. This prior art also describes the measurement of film thickness on a test object. However, the thickness measurement is not accomplished spectroscopically as in the present invention. De Groot measures film thickness by measuring spatial separation between axial fringes created during the axial scan. The present invention requires no axial scanning and measures film thickness through the analysis of the reflected spectrum.

Schwider [9] describes a white light interferometer arranged in a Fizeau configuration where the reference plate is 20 µm to 50 µm from the sample, and the reflected light is analyzed with a spectrometer. The air gap is the path length difference between the interfering waves, and so the periodicity shown in the spectrometer signal relates directly to the length of the air gap, and thus the height profile of the sample. The primary difficulty with this arrangement is a small working distance.

Frequency Domain Optical Coherence Tomography (also Fourier Domain OCT or FD-OCT) is an interferometric method where the sample reflects light in one leg of a Michelson interferometer, and the reference leg remains at a fixed position [10]. The source is broadband, and the spectrum of the light returned form the interferometer is analyzed in the Fourier domain. The OPD between the two legs causes fringes in the returned spectrum. FD-OCT systems can employ either an incoherent broadband source and a spectrometer as the detector, or a swept wavelength source with a photodiode detector and a data acquisition system.

Simultaneous Measurements and Microscope

For the measurement of wafer thickness and shape, present technology requires two separate sensors. One example of prior art uses one sensor that measures shape but not thickness, and a second sensor that measures thickness but not shape. If both sensors measure from the same side of the wafer, integration with a microscope becomes difficult. The addition of a microscope is desirable because it facilitates user interaction to determine precise measurement locations. Another example of prior art uses two shape sensors facing opposite sides of the wafer and a means of calibrating their separation. The ability to measure from a single side is desirable because it eliminates the need for a wafer chuck with an open bottom.

Another example of the utility of simultaneous thickness and distance measurements is a wafer having etched features that are followed by the deposition of a photoresist. The photoresist covers the whole wafer, including the bottom of the etched features. The measurements required for this wafer include etch depth, photoresist and wafer thicknesses, and wafer shape.

References

1. H. G. Tompkins and W. A. McGahan, *Spectroscopic Ellipsometry and Reflectometry,* John Wiley & Sons, 1999.
2. C. A. Duran, A. A. Maznev, G. T. Merklin, A. Mazurenko, and M. Gostein, "Infrared Reflectometry for Metrology of Trenches in Power Devices," IEEE/SEMI Advanced Semiconductor Manufacturing Conference, p. 175, 2007.
3. R. S. Mundt, "Methods and Apparatuses for Trench Depth Detection and Control," U.S. Pat. No. 6,878,301.
4. P. De Groot, "Optical Systems for Measuring Form and Geometric Dimensions of Precision Engineered Parts," U.S. Pat. No. 6,822,745.
5. Born & Wolf, *Principles of Optics,* 6$^{th}$ Edition, Pergamon Press, 1980.
6. K. C. Johnson and F. E. Stanke, "Method of Measuring Meso-Scale Structures on Wafers," U.S. Pat. No. 6,806,105.
7. P. De Groot and X. C. De Lega, "Scanning Interferometry for Thin Film Thickness and Surface Measurements," U.S. Pat. No. 7,324,210.
8. J. M. Schmitt, "Optical coherence Tomography: A Review," IEEE Journal of Selected Topics in 'Quantum Electronics, Vol. 5, No. 4, p. 1205, 1999.
9. J. Schwider and L. Zhou, "Dispersive Interferometric Profilometer," Optics Letters, Vol. 19, No. 13, p. 995, 1994.
10. M. A. Choma, M. V. Sarunic, C. Yang, J. A. Izatt, "Sensitivity Advantage of Swept Source and Fourier Domain optical Coherence Tomography," Optics Express, Vol. 11, No. 18, p. 2183, 2003.
11. "Taking the Mystery out of Thin-Film Measurement," http://www.filmetrics.com/technology, Filmetrics, Inc. 2006.
12. D. S. Marx and D. L. Grant, "Trench Measurement System Employing a Chromatic Confocal Height Sensor and a Microscope," U.S. Pat. No. 7,477,401, herein incorporated by reference.
13. T. R. Corle and G. S. Kino, *Confocal Scanning Optical Microscopy and Related Imaging Systems,* Academic Press, 1996.
14. D. S. Marx and D. L. Grant, "System for Directly Measuring the Depth of a High Aspect Ratio etched Feature on a Wafer," U.S. patent publication 2010/0321671, herein incorporated by reference.

DISCLOSURE OF THE INVENTION

The instant invention discloses a device and methods for simultaneously measuring the thickness of individual wafer layers, the depth of etched features on a wafer, and the three-dimensional shape of a wafer. Shape measurements include both microscopic surface profiles and macroscopic metrics such as warp. In its most basic design, the structure of the device is comprised of a broadband source, means for separating source and received light, an interferometer that separates or combines measurement and reference light and that has a measurement leg and a reference leg, a detector, and means for analyzing a received spectrum which is comprised of a measurement of intensity versus wavelength.

The instant invention, which is partially disclosed in [14] combines the apparatus disclosed in [14] with a Michelson interferometer and expands on the disclosed methods. Thus the instant invention has all of the capabilities described in [14] with additional capabilities to measure surface profiles.

In some respects the present invention is similar to Fourier Domain Optical Coherence Tomography (FD-OCT) or low coherence interferometry, and in other respects it is similar to reflectometry. Fundamentally, the present invention combines a reflectometer with an interferometer and includes signal processing and analysis to recover multiple measurements, such as shape (distance) and thickness of a test object such as a wafer simultaneously.

Reflectometers are well-known to those knowledgeable in the art. However, we know of no prior art that places the reflectometer optics in one leg of a Michelson interferometer, or that analyzes the reflected spectrum for both shape (microscopic surface profiles and macroscopic warp) and thickness.

OCT systems are designed for biological specimens consisting of weakly scattering objects, such as cells, with little a priori information regarding their location in any of the three dimensions. The present invention is intended specifically for test objects that consist of distinct layers of homogeneous media. These layers may include silicon wafers such as carrier wafers and product wafers, as well as adhesive layers and photoresist layers. As will be explained, the presence of these layers gives rise to distinct signals due to the Fabry-Perot effect. This effect is not present for weakly scattering objects such as those found in biological samples. This difference affects the design and operation of the present invention and makes it distinct from OCT systems intended for biological specimens.

BEST MODE FOR CARRYING OUT THE INVENTION

The best mode for carrying out the invention is presented in terms that disclose a device and methods for measuring the thickness of, the shape of, and the depth of etched features on a wafer.

The invention combines a Michelson interferometer which is used for distance measurements, with a reflectometer which is used for thickness measurements. While Michelson interferometers and reflectometers are each well known in the art, their combination for the purpose of simultaneous shape and thickness measurements is novel. Furthermore, the successful implementation of this optical architecture compels specific requirements for the optical source, the signal processing, and system methods. This disclosure discusses the optical physics, the signal processing, optical source requirements, and system level implementation.

Several system embodiments are discussed below. They all have the common features of a broadband source, a measurement leg comprised of optics to illuminate and receive the reflection from a test object such as a wafer, a reference leg which, along with the measurement leg, forms a Michelson interferometer, and a means to analyze the spectrum of the reflected and recombined light from the interferometer.

Each embodiment can utilize one of at least two types of sources: a coherent swept wavelength source, such as a swept laser, or an incoherent broadband source, such as an incandescent bulb or a light emitting diode (LED) or a superluminescent diode (SLED). In the first case, the received spectrum is recovered in time domain by correlating in time with the swept source. In the second case, the receiver includes a spectrometer to analyze the received spectrum.

Each embodiment can include a microscope by inserting an additional beamsplitter in the infinite conjugate region of the measurement leg of the interferometer. The microscope is not required to perform the measurement methods, but it is usually helpful because it allows direct viewing of the sample measurement location.

Each embodiment requires some degree of spatial coherence, whether the source is a temporally coherent laser or a temporally incoherent broadband source. As is known to those knowledgeable in the art, spatial coherence is typically achieved by the use of a pinhole or an optical fiber with a small core diameter. The degree of spatial coherence required is dependent on the specific type of Michelson interferometer utilized. Examples of different types of Michelson interferometers this invention can utilize but are not limited to are the Linnik and Mirau configurations [13].

The methods and signal processing are essentially the same for each embodiment. They entail analyzing the received spectrum and relating periodicities in the received spectrum to the optical path difference (OPD) between the two legs of the interferometer to measure shape (distance) of the test object and simultaneously measuring the thickness of the test object or a film on the test object.

Optical Physics

A Michelson interferometer splits a propagating wavefront into two separate legs. One leg is the reference leg which is terminated by a mirror, and the other is the measurement leg which contains the wafer. The reference leg reflects all of the incident light. In the ideal case, there is no dispersion across the source spectrum. When the reference light returns to the beam splitter, it is phase delayed by twice the propagation distance to the mirror. The measurement leg reflects from the silicon wafer, and the amplitude and phase of the reflected field depends on wavelength and wafer thickness, according to the Fabry-Perot relation [5]:

$$r(k) = \frac{r_1 + r_2 \exp(jk\delta)}{1 + r_1 r_2 \exp(jk\delta)}, \quad (1)$$

where $r_1$ and $r_2$ are the reflection coefficients from the first and second surfaces of the silicon wafer, $\delta = 2nl\cos\theta$, and $k = 2\pi/\lambda$, where n is the index of refraction of the silicon wafer, l is the thickness of the wafer, $\theta$ is the angle of incidence and $\lambda$ is the free space wavelength. The amplitude of the power spectral density, S(k), represents the spectral properties of the source. In addition, the reflected measurement wavefront is phase delayed by the round trip propagation.

The field at the receiver is a linear combination of the fields reflected from each leg of the Michelson interferometer:

$$E(k) = S(k)[\exp(jk2z_2) + \alpha \exp(jk2z_1) r(k)], \quad (2)$$

where $z_1$ and $z_2$ are the path lengths of the measurement and reference legs, respectively, and $\alpha$ accounts for a non-ideal beamsplitter.

The voltage signal produced by the receiver is proportional to the optical intensity:

$$I(k) = |E|^2 = |S(k)|^2 [1 + \alpha^2 |r(k)|^2 + 2\alpha Re\{\exp(jk\Delta_z) r(k)\}], \quad (3)$$

where $\Delta_z = 2(z_1 - z_2)$ is the path length difference. Spectroscopically, the detected signal has several periodic components. One periodic component is due to $\Delta_z$, another is due to $\delta$, and other components with periodicity equal to the sum and difference of $\Delta_z$ and $\delta$.

With proper signal processing, the Fourier components due to $\Delta_z$ and $\delta$ can be separated so that distinct measurements of these OPD's are made. For example, the Fourier transform of the received spectrum from optical frequency, k, domain to the time delay, $\tau$, domain, produces several peaks, one for each of the periodicities described above.

A source of error would be differences in the dispersion of the optical components in the two arms of the Michelson interferometer.

Preferred Embodiments

The optical source can be either an incoherent broadband source, such as an LED or a SLED, or a coherent source such as a swept laser. In either case, the source consists of many wavelengths. The receiver must be matched to the source. If an incoherent source is used, then the receiver must be a spectrometer with appropriate spectral resolution. If the source is a swept laser, then the receiver is a photodetector and data acquisition system synchronized to the laser sweeps so that spectral information is retained.

Figure 1:
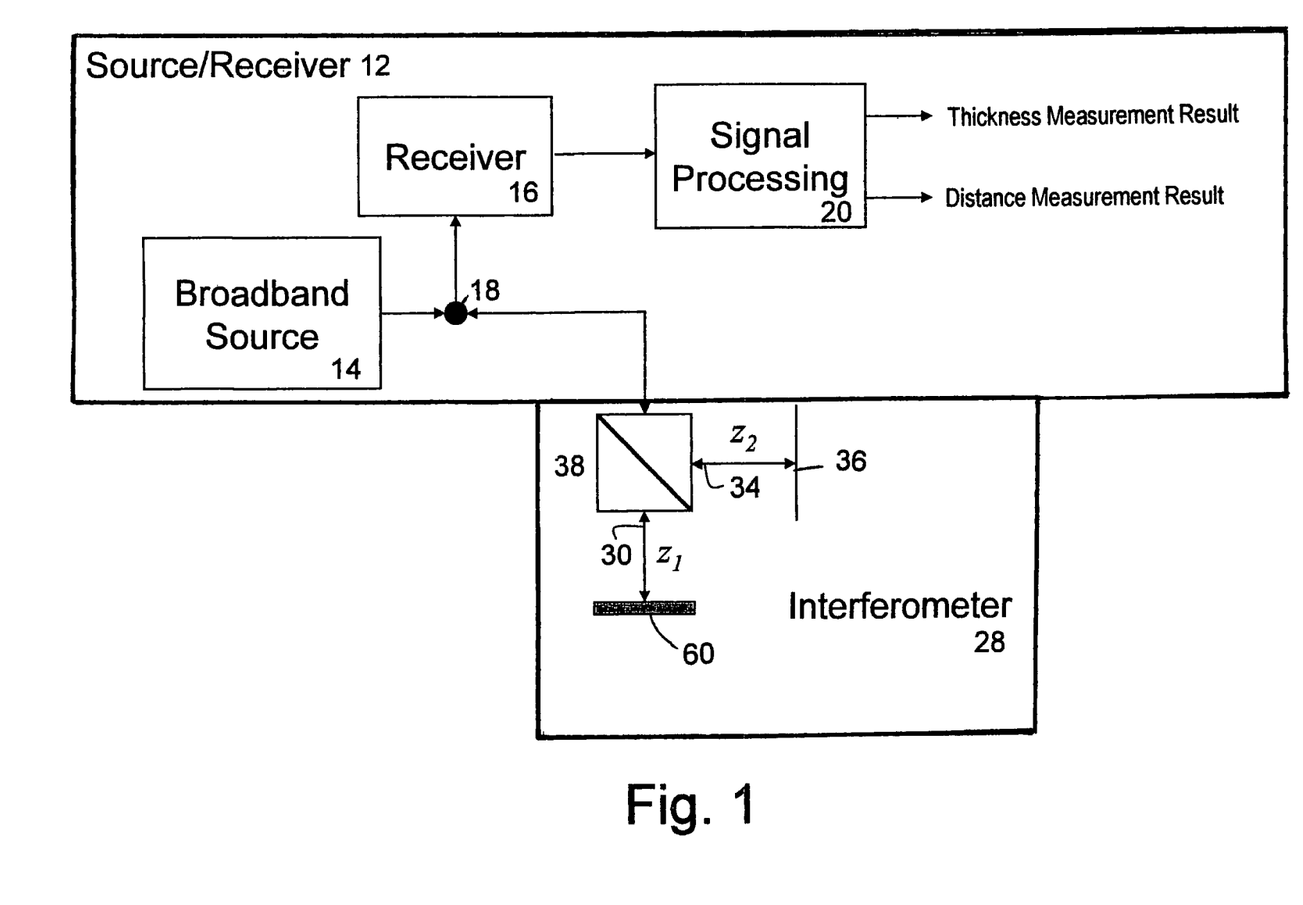
FIG. 1 is a schematic showing a basic, fundamental embodiment of a device for measuring the thickness of, the shape of, and the depth of etched features on a test object comprising a wafer. This basic embodiment includes a source/receiver section and an interferometer section.

There are several embodiments of the structure of the device 10. A basic, fundamental embodiment, as shown in FIG. 1, is comprised of a source/receiver section 12 having a broadband source 14, a receiver 16 and a signal processing section 20; and an interferometer 28 that separates or combines measurement and reference light, and that has a measurement leg 30 and a reference leg 34. Located on the measurement leg 30 is a test sample comprising a wafer 60. It should be noted that the device 10 analyzes a received spectrum, wherein the received spectrum is comprised of a measurement of intensity versus wavelength. To facilitate the separation of source and received light, a separation means 18 comprising a beamsplitter is utilized. The beamsplitter is selected from the group consisting of a fiber optic circulator or coupler, or a bulk optic beamsplitter. The means can also be comprised of a circulator 24. The interferometer 28 is constructed from the group consisting of fiber optic components or free space components. Preferably, the interferometer 28 is comprised of a Michelson interferometer having a mirror 36 or retroreflector with axial adjustment in the reference leg 34, and a beamsplitter 38.

If desired, a microscope 44 and/or a collimator 50 can be added to the device 10 to increase the utility and capability of the invention. The microscope 44 will allow an observer to view an image of the measurement location.

As previously disclosed the device 10 is utilized for a test object such as a wafer 60. The location of the wafer 60 is determined from a measurement by an optical path length that is defined by the distance from the beamsplitter 38 to the measurement leg 30. Additionally, as previously disclosed, either a coherent swept wavelength source or an incoherent broadband source is utilized.

Figure 2:
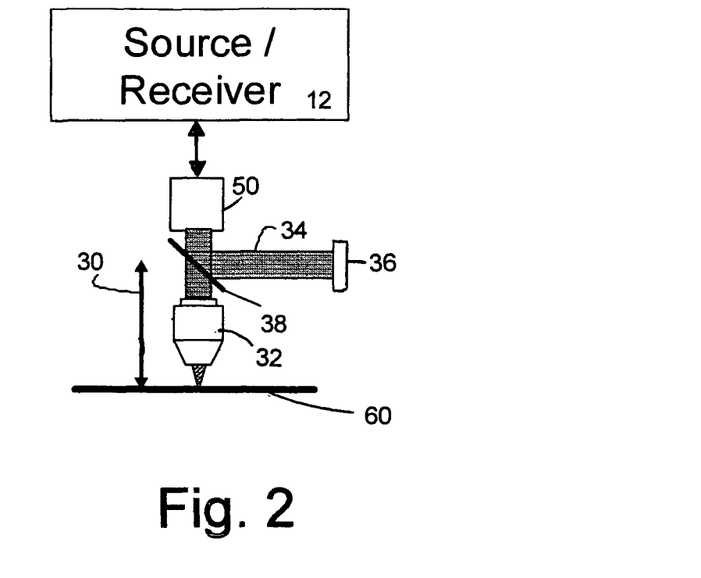
FIG. 2 is an embodiment of the device wherein the interferometer includes a microscope objective lens in the measurement leg and a collimator to couple light from an optical fiber to free space optics.
Figure 3:
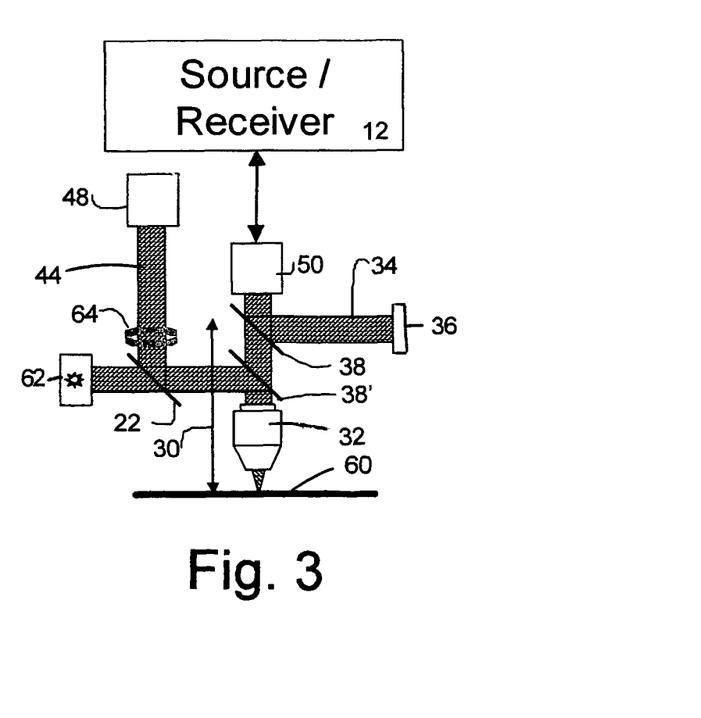
FIG. 3 is an embodiment of the device including microscope imaging through a common objective lens.
Figure 4:
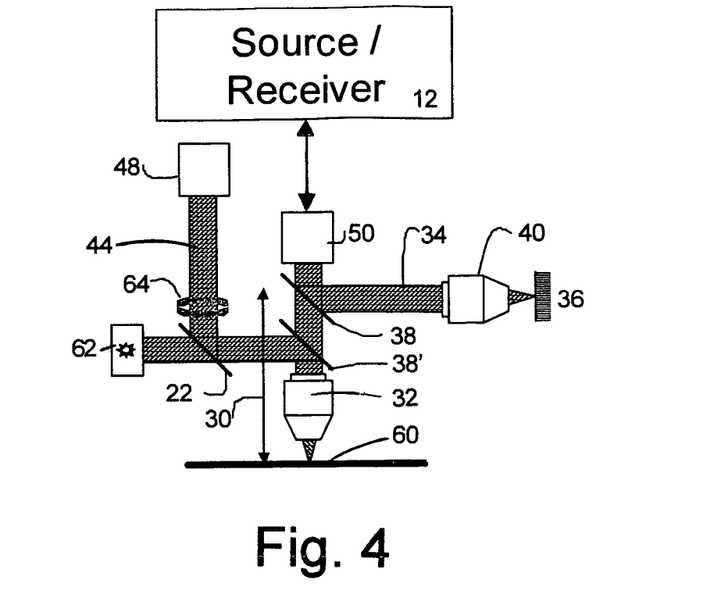
FIG. 4 is an embodiment wherein the interferometer includes objective lenses in both the measurement leg and the reference leg.
Figure 5:
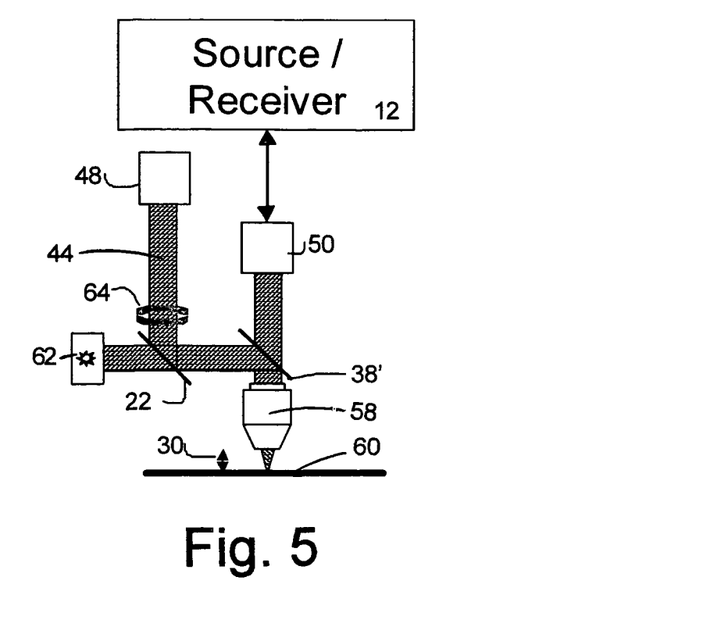
FIG. 5 is an embodiment of the device that utilizes a Mirau interferometer in place of a Michelson interferometer.

As also previously disclosed there are several viable embodiments of the device 10. A second embodiment, as shown in FIG. 2, is an embodiment of the device 10 wherein the interferometer 28 includes a microscope objective lens 32 in the measurement leg 30 and a collimator 50 to couple light from an optical fiber to free space optics. A third embodiment, as shown in FIG. 3, includes microscope imaging through a common objective lens 32. Additionally, as shown in FIG. 3, the microscope 44 includes a light source 62 and a tube lens 64, and a camera 48 can be interfaced with the microscope 44. A fourth embodiment, as shown in FIG. 4, includes the interferometer 28 having objective lenses 32,40 in both the measurement leg 30 and the reference leg 34. The use of objective lenses 32,40 in both legs 30,34 causes the interferometer 28 to have identical dispersive components. Any dispersion that occurs in one leg but not the other is a source of measurement error for the shape (distance) measurement. As with the third embodiment, the fourth embodiment also comprises a microscope 44 including a light source 62 and a tube lens 64. A fifth embodiment, as shown in FIG. 5, utilizes a Mirau interferometer having a Mirau objective lens 58. The Mirau objective lens contains the beamsplitter and reference mirror, and thus the reference leg, within the lens body.

Figure 6:
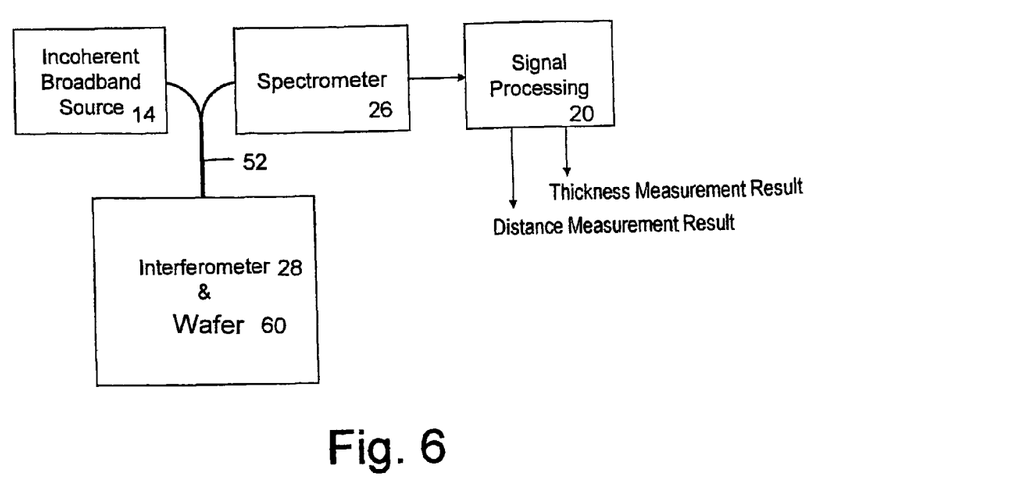
FIG. 6 is an embodiment of the device wherein the source is an incoherent broadband source such as an incandescent source or a LED. A fiber optic splitter/coupler performs the function of a spatial filter to provide the required spatial coherence.
Figure 7:
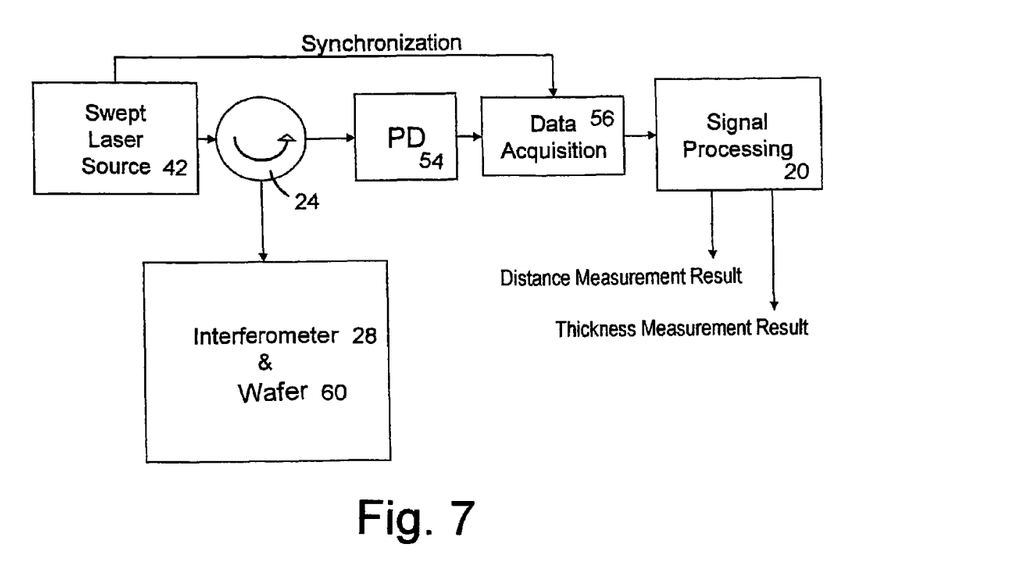
FIG. 7 is an embodiment of the device wherein the source is a coherent swept laser. The element identified as "PD" is a photodiode that converts the received light intensity into electrical current, which is sensed by the data acquisition section.

FIG. 6 shows a sixth embodiment of the device 10 wherein the source is an incoherent broadband source 14 such as an incandescent source or an LED or a SLED. A fiber optic splitter/coupler 52 performs the function of a spatial filter to provide the required spatial coherence. As also shown in FIG. 6, embodiment 6 includes a spectrometer 26 and a signal processing section 20. As shown in FIG. 7, a seventh embodiment of the device 10 utilizes a coherent swept laser source 52. The element identified as "PD" is a photodiode 54 that converts the received light intensity into electrical current, which is sensed by a data acquisition section 56. As with the sixth embodiment, the seventh embodiment also includes the signal processing section 20.

Methods

There are two methods that are disclosed in the instant invention. The first method is utilized for simultaneously measuring the thickness of individual wafer layers, including a direct method for measuring the depth of etched features, and the distance to a first wafer surface. The direct method provides direct measurement of the depth of an etched feature as a result of the interference between the reflection from the upper (etched) surface of the wafer 60 and the lower surface of the etched feature. For a more detailed explanation of the direct method of etch depth measurement, see [14]. The first method describes how the instant invention performs the different types of measurement simultaneously at a fixed location on the wafer. The first method comprises the following steps:
 a) acquire a test object comprising a wafer,
 b) place the wafer on a wafer chuck so that the wafer completes a measurement leg of an interferometer,
 c) record a spectrum of the received light from the interferometer,
 d) evaluate the periodicities in the recorded spectrum, allowing for dispersion, if necessary, and transforming the spectrum to time delay domain,
 e) determine signal peaks in time delay domain,
 f) assign one time delay peak to indicate the path length difference between the measurement and reference legs of the interferometer,
 g) assign the other time delay peaks to the various wafer thickness layers, including an etch depth layer according to the direct method for etch depth measurement, and
 h) convert the time delay to distance or thickness.

The time delay domain peak that is due to the interferometer 28 path length difference is determined by observing which peaks are sensitive to changes in path length differences. The peaks that are not sensitive are due to Fabry-Perot interference in the wafer 60.

The spectrum periodicities are evaluated using a Fourier transform, and either a coherent swept wavelength or an incoherent broadband source is utilized.

A modification to the first method is to use the scanning method of etch depth measurement, as described in [14] in place of the direct method. The scanning method requires recording thickness measurements during a short lateral movement of the measurement spot across the etched feature.

The second method that is disclosed is utilized for simultaneously measuring the thickness of individual wafer layers, the variation of depth of etched features, and the wafer shape. The second method essentially performs the first method repeatedly as the measurement spot as the wafer is translated under the measurement spot. As the wafer is thus scanned, it is possible that the wafer thickness or shape varies such that the corresponding peaks transition outside the specified unambiguous range. The second method provides a means to use the peak variation as feedback to control the optical path length difference, and thus prevent ambiguity. The second method comprises the following steps:
 a) acquire a test object comprising a wafer,
 b) place the wafer in a wafer chuck so that the wafer completes a measurement leg of an interferometer,
 c) record a spectrum of the received light from the interferometer,
 d) set the interferometer reference mirror axial position,
 e) assign minimum and maximum ranges for wafer shape and thickness peaks,
 f) mechanically scan the wafer laterally underneath the sensor,
 g) record a spectrum of the received light from the interferometer,
 h) Fourier transform the received light spectrum to time delay domain
 i) determine signal peaks in time delay domain, j) determine which peaks in time delay domain are due to the interferometer path length difference by observing which peaks are sensitive to changes in path length difference,
k) convert the time delay corresponding to a Fabry-Perot interference into wafer thickness,
l) convert the time delay corresponding to a interferometer path length difference to distance,
m) adjust the interferometer reference mirror axial bias if the wafer shape peak is at the minimum or maximum,
n) integrate interferometer reference mirror axial movements into shape measurements, and
o) report the wafer shape and thickness map (vs. wafer location).

As with the first method, either a coherent swept wavelength or an incoherent broadband source is utilized. The interferometric distance measurement includes a macroscopic shape measurement, a microscopic surface profile measurement, and a microscopic surface roughness measurement.

The time delay domain peak that is due to the interferometer 28 path length difference is determined by observing which peaks are sensitive to changes in path length difference. Again, as in the first method, the peaks that are not sensitive are due to Fabry-Perot interference in the wafer 60.

Signal Processing

From Equation (3), it is evident that the received signal oscillates in optical frequency (wavelength) according to several components. The second term is no different from the usual Fabry-Perot etalon reflected signal. Therefore, the reflected signal contains all of the usual components currently used by reflectometers to measure thickness [14]. However, the received signal in this invention also includes the third term from Equation (3) which contains the usual Fabry-Perot reflected signal mixed with an oscillation corresponding to the path length difference between the two legs. These terms can be distinguished from the $2^{nd}$ term because the $2^{nd}$ term does not depend on path length difference.

The detected signal as a function of wavelength is as shown in Eq. (3). The Fourier transform of this signal can be calculated by one of several different methods, such as Fast Fourier Transform (FFT), parametric spectral estimation, etc. Any of the spectral estimation methods well known to those knowledgeable in the art may be used. The transformed signal contains many components which must be interpreted. The Fourier transform of Eq. (3) with application of the convolution theorem Eq. 4 is:

$$\hat{I}(\tau) = \hat{S}(\tau) + \hat{S}(\tau) * \lfloor \alpha^2 F(|r(k)|^2) + 2\alpha F (Re\{r(k)\exp(jk\Delta_z)\}) \rfloor, \quad (4)$$

Where F(.) indicates the Fourier transform. Further algebraic analysis (the fine details are skipped) of the two terms inside the bracket of Eq. (4) reveals signal components of the form, $$\hat{I}(\tau) = \hat{S}(\tau) + \alpha^2 \sum_{m=0}^{\infty} a_m \hat{S}(\tau - m\delta) + 2\alpha \sum_{m=0}^{\infty} b_m \hat{S}(\tau \pm \Delta_z + m\delta) \quad (5)$$

The first term on the right hand side of Eqn. (5) is simply the response of the source alone. The second term consists of a peak and its harmonics related to only the thickness of the wafer without any contribution from the reference mirror. The third term includes a peak due to the OPD of the reference mirror alone (m=0), and the mixing of this signal with the signal peaks due to the wafer thickness.

Monitoring the time delay peaks (Fourier transform of the spectrum) corresponding to the $2^{nd}$ term is a measure of wafer thickness. Monitoring the separation between the time delay peaks corresponding to the mixing of the third term is a measure of path length difference between the two legs of Michelson interferometer. If the reference leg is held constant, then the path length difference is due to variation in distance to the wafer surface, which in turn is due to wafer shape.

Measurement Method for Small Shape Variation

Figure 8:
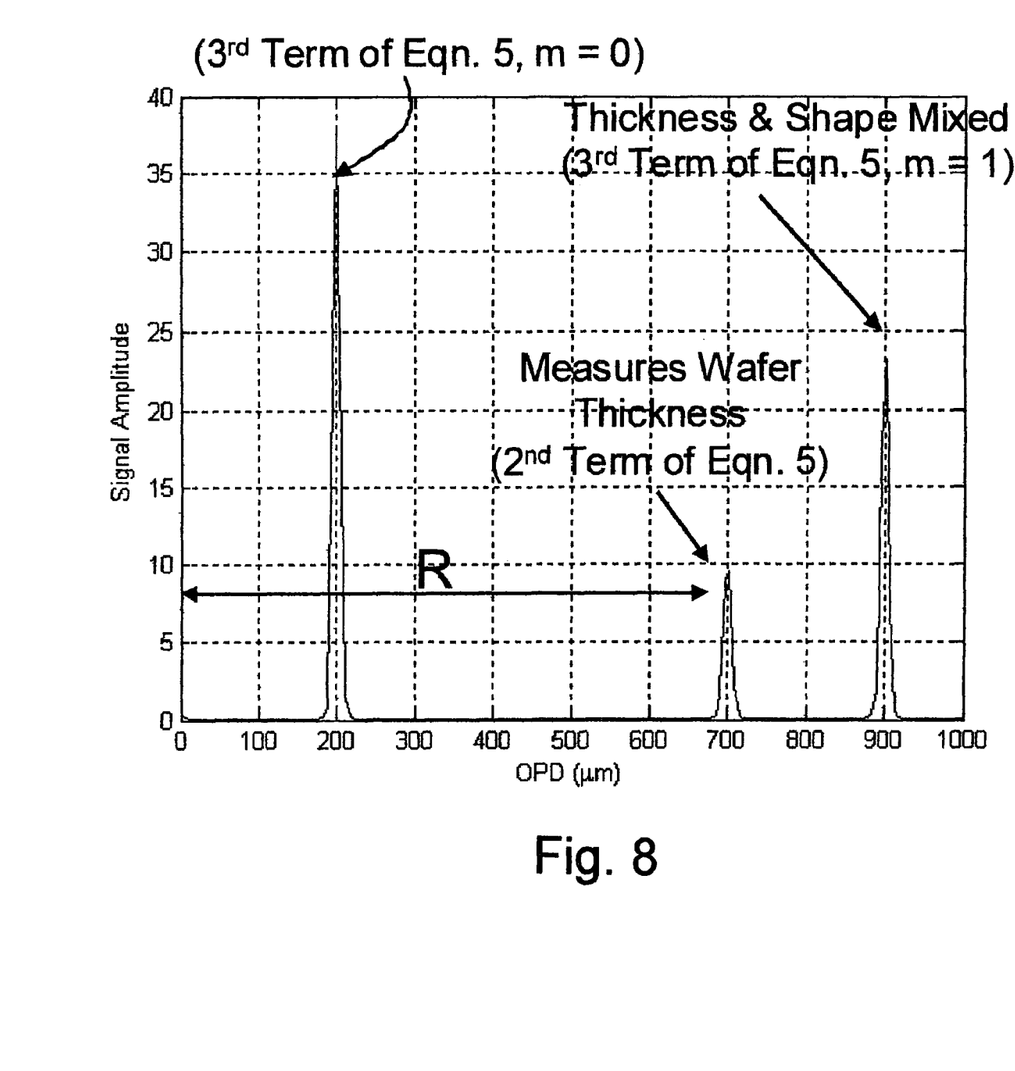
FIG. 8 is a graph showing an example measurement result.

The optical interferences due to the Fabry-Perot effect and the Michelson interferometer produces oscillations in received intensity according to optical frequency (wavelength). Fourier transforming the spectrum produces a peak for each oscillation frequency in time delay—the Fourier transform domain of optical frequency. FIG. 8 shows an example of the measurement peaks where the measurement sample is a wafer with a single layer.

Suppose a wafer is mechanically scanned underneath the measurement sensor. If the wafer has warp (shape variation), then the shape peak moves to greater or lesser OPD values as the wafer surface moves closer or further from the sensor. Recording the peak locations and correlating these measurements with wafer position results in a measure of wafer warp. The present invention has a limitation regarding the unambiguous range of OPD variation for the measurement of wafer warp. Because the processed signal produces several peaks, as discussed above and shown in Eqn. (5), ambiguities could arise. If the shape peak approaches too close to the thickness peak, then confusion can result. For a given test object and reference mirror position, a specific unambiguous range can be determined. FIG. 8, by way of example, indicates this range, "R".

The position of the shape peak in the OPD graph can be actively adjusted in order to optimize the use of the unambiguous range. The adjustment consists of biasing the axial position of the reference to favor an OPD either less than or greater than zero relative to the measurement leg. Alternatively, the bias can be added to the measurement leg.

Measurement Method for Large Shape Variation

For the case where the wafer shape is large than the unambiguous range of the shape peak, as described above, a feedback control loop can be utilized to keep the shape peak within its range while tracking the shape measurement of the wafer. An example measurement result, as shown in FIG. 8, utilizes the instant invention when the test object is a silicon wafer 700 μm thick. The source is near infrared (where silicon is transparent), and the path length difference between the measurement leg and the reference leg is 200 μm. As the distance (shape) of the wafer changes, the shape peak will translate accordingly. The region "R" determines the unambiguous range of the shape measurement.

Figure 9:
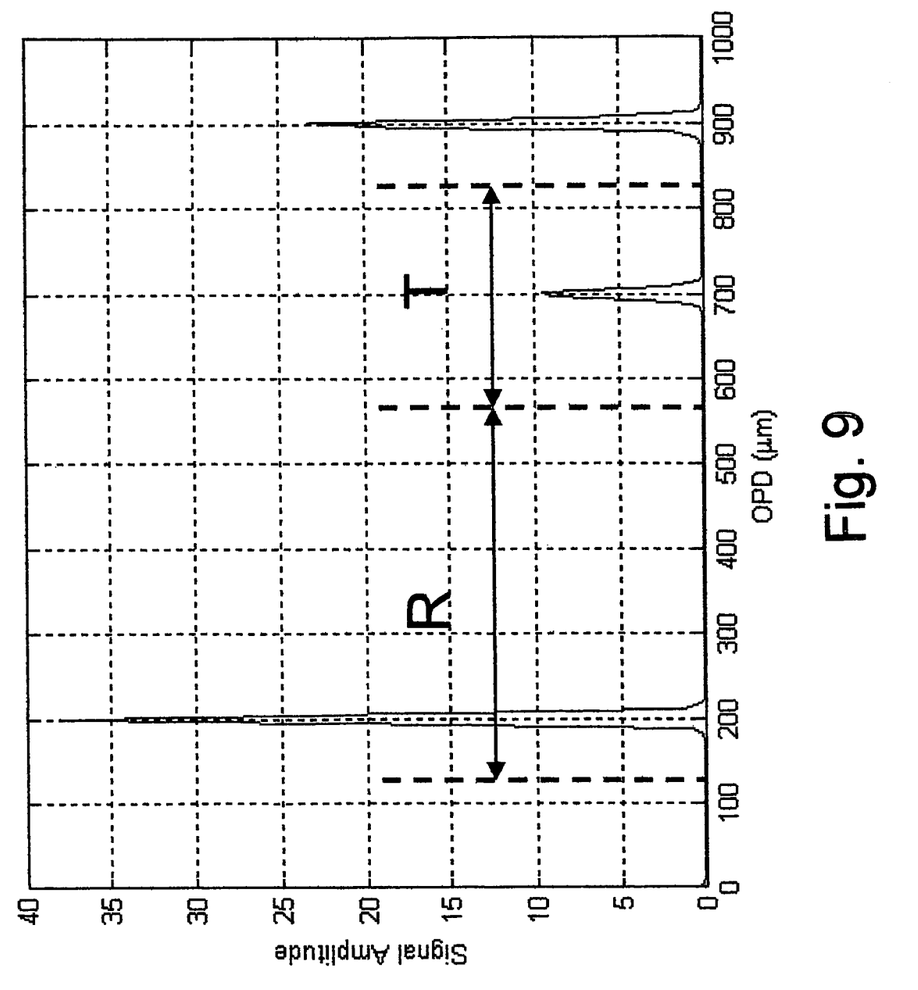
FIG. 9 is a graph showing an example measurement result with unambiguous measurement ranges indicated. As long as the shape and thickness measurement variations remain within these ranges, the measurements will remain unambiguous.

As shown in FIG. 9, as a wafer is scanned, its thickness can also change as well as its shape (distance). Therefore, the unambiguous range of shape measurement is reduced. Typically, for wafers in the semiconductor industry, the variation in the distance measurement due to wafer shape (~100 μm to ~500 μm) is much larger than the wafer thickness variation (~1 μm to ~40 μm) for an individual wafer. Therefore, monitoring the shape peak is sufficient. If necessary, however, the thickness peak can also be traced, and the unambiguous range of the shape peak dynamically modified to accommodate movements in the thickness peak.

While the invention has been described in detail and pictorially shown in the accompanying drawings it is not to be limited to such details, since many changes and modifications may be made to the invention without departing Wafer Shape Thickness and Trench Measurement

| Element Designation (For convenience of the Examiner, not part of the specification) | |
|---|---|
| 10 | Device (Structure) |
| 12 | Source/Receiver Section |
| 14 | Broadband Source |
| 16 | Receiver |
| 18 | Separation Means (Source and Received Light) |
| 20 | Signal Processing Section |
| 22 | Beamsplitter |
| 24 | Circulator |
| 26 | Spectrometer |
| 28 | Interferometer |
| 30 | Measurement Leg |
| 32 | Objective Lens (#1) |
| 34 | Reference Leg |
| 36 | Mirror/Retroreflector |
| 38 | Beamsplitter |
| 38' | Beamsplitter |
| 40 | Objective Lens (#2) |
| 42 | Swept Laser Source |
| 44 | Microscope |
| 46 | |
| 48 | Camera |
| 50 | Collimator |
| 52 | Fiber Optic Splitter/Coupler |
| 54 | Photodiode |
| 56 | Data Acquisition Section |
| 58 | Mirau Objective Lens |
| 60 | Wafer |
| 62 | Light Source |
| 64 | Tube Lens |

The invention claimed is:

1. A device for simultaneously measuring a plurality of characteristics of a wafer, the wafer including a first surface, a second surface and an etched surface positioned between the first surface and the second surface, wherein said device is comprised of:
 a) a support structure to selectively position the wafer,
 b) a broadband source,
 c) a beamsplitter or circulator to separate source and received light,
 d) an interferometer that separates or combines measurement and reference light and having a measurement leg and a reference leg, wherein said interferometer directs the measurement light in the measurement leg to reflect from the first surface, directs measurement light through the first surface to reflect from the second surface, and directs measurement light through the first surface to reflect from the etched surface,
 e) a receiver to receive a spectrum of a measurement of intensity versus wavelength of light reflected from the first surface, the second surface, and the etched surface simultaneously, and
 f) a data processing system to analyze the received spectrum and to relate
 periodicities in the received spectrum to simultaneously measure shape and thickness of the wafer for each of a plurality of positions of the wafer.

2. The device as specified in claim 1 wherein said broadband source is comprised of a coherent swept wavelength source.

3. The device as specified in claim 1 wherein said broadband source is comprised of a broadband source with low temporal coherence.

4. The device as specified in claim 1 wherein said beamsplitter is selected from the group consisting of a fiber optic beamsplitter and a bulk optic beamsplitter.

5. The device as specified in claim 1 wherein the shape is calculated as a function of distance from the beamsplitter or circulator to the wafer and is determined by measuring the difference between the optical path length of the reference leg and the optical path length of the measurement leg.

6. The device as specified in claim 1 wherein said interferometer is constructed from components that are selected from the group consisting of fiber optic components and free space components.

7. The device as specified in claim 1 wherein the interferometer is comprised of a Michelson interferometer having a mirror or retroreflector with axial adjustment in the reference leg, an objective lens in the measurement leg and a beamsplitter.

8. The device as specified in claim 1 wherein the interferometer is comprised of a Michelson interferometer containing an objective lens in the measurement leg and a matching objective lens in the reference leg.

9. The device as specified in claim 1 wherein the interferometer is comprised of a Mirau interferometer wherein a beamsplitter and a reference mirror are integrated in the objective lens.

10. The device as specified in claim 1 wherein said receiver is selected from the group consisting of a photodetector of sufficient bandwidth and a spectrometer.

11. The device as specified in claim 1 further comprising a microscope wherein the microscope utilizes the same objective lens as the measurement leg to view the wafer.

12. The device as specified in claim 1 further comprising a collimator.

13. The device as specified in claim 1 further comprising means for independently adjusting the optical path length of the reference leg to set the distance measurement bias.

14. The device as specified in claim 1 further comprising means for independently adjusting the optical path length of the measurement leg to set the distance measurement bias.

15. The device as specified in claim 1 further comprising a spatial filter.

16. A method for simultaneously measuring the thickness of individual wafer layers, including a direct method for measuring the depth of etched features, and the distance to a first wafer surface, wherein said method comprises the following steps:
 a) acquire a test object comprising a wafer, the wafer including at least one individual layer having a first surface, and second surface opposite the first surface and an etched feature having an etched surface positioned between the first and second surface,
 b) place the wafer on a wafer chuck so that the wafer completes a measurement leg of an interferometer and the first surface faces a source of light for an interferometer,
 c) record a spectrum of the received light from the interferometer, the light including a portion reflected from the first surface and a portion passing through the first surface and reflected from one of the second surface and the etched surface, the recorded spectrum a measurement of intensity versus wavelength, and
 d) evaluate the periodicities in the recorded spectrum, allowing for dispersion, if necessary, and transforming the spectrum to time delay domain,
 e) determine signal peaks in time delay domain, f) assign one time delay peak to indicate the first surface based on a path length difference between the measurement leg and a reference leg of the interferometer, g) assign at least one other time delay peak to said one of the second surface and the etched surface by calculating interference between light reflected from the first surface and light passing through the first surface and reflected from said one of the second surface and the etched surface, and h) convert the time delay to distance or thickness.

17. The method as specified in claim 16 wherein a scanning method of measuring the depth of etched features is utilized.

18. The method as specific in claim 16 wherein the time delay domain peak due to the interferometer path length difference is determined by observing which peaks are sensitive to changes in path length difference, wherein the peaks that are not sensitive are due to Fabry-Perot interference in the wafer.

19. An optical measurement system for determining shape and thickness of a wafer, the wafer including a first surface, a second surface and an etched surface positioned between the first surface and the second surface, the system comprising:

a) a data acquisition system having a broadband light source producing multiple optical frequencies of light, a beamsplitter, an interferometer that separates or combines measurement and reference light having a measurement leg and a reference leg, wherein said interferometer directs the measurement light in the measurement leg to reflect from the first surface, directs the measurement light through the first surface to reflect from the second surface and directs the measurement light through the first surface to reflect from the etched surface and a receiver positioned to receive a spectrum of a measurement of intensity versus wavelength of light reflected from the first surface, the second surface, and the etched surface simultaneously; and b) a data processing system adapted to receive the spectrum from the receiver, relate periodicities in the spectrum to simultaneously measure shape and thickness of the wafer and produce a signal representative of the shape and thickness of the wafer.

* * * * *